United States Patent
Nishiyama

(10) Patent No.: US 11,270,512 B2
(45) Date of Patent: Mar. 8, 2022

(54) IMAGE GENERATING DEVICE FOR GENERATING THREE-DIMENSIONAL DISPLAY DATA

(71) Applicant: Furuno Electric Co., Ltd., Nishinomiya (JP)

(72) Inventor: Koji Nishiyama, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 0 days.

(21) Appl. No.: 16/690,866

(22) Filed: Nov. 21, 2019

(65) Prior Publication Data
US 2020/0090414 A1 Mar. 19, 2020

Related U.S. Application Data

(63) Continuation-in-part of application No. PCT/JP2018/018645, filed on May 15, 2018.

(30) Foreign Application Priority Data

May 24, 2017 (JP) .............................. JP2017-103148

(51) Int. Cl.
*G06T 19/00* (2011.01)
*G01C 21/20* (2006.01)
(Continued)

(52) U.S. Cl.
CPC ............ *G06T 19/006* (2013.01); *G01C 21/20* (2013.01); *G06T 15/20* (2013.01); *G06T 19/20* (2013.01);
(Continued)

(58) Field of Classification Search
CPC ....... G06T 19/006; G06T 15/20; G06T 19/20; G06T 2200/24; G06T 2219/2004; G06T 2219/2016; G01C 21/20
See application file for complete search history.

(56) References Cited

U.S. PATENT DOCUMENTS 5,056,411 A * 10/1991 Baker .................. G05D 1/0206
89/41.22
5,101,356 A * 3/1992 Timothy .................. G01S 19/54
342/352

(Continued)

FOREIGN PATENT DOCUMENTS

JP S61114380 U 7/1986
JP H06301897 A 10/1994
(Continued)

OTHER PUBLICATIONS

Butkiewicz, Thomas. "Designing Augmented Reality Marine Navigation Aids Using Virtual Reality." Oceans 2017—Anchorage. IEEE, 2017. (Year: 2017).*

(Continued)

*Primary Examiner* — King Y Poon
*Assistant Examiner* — Vincent Peren
(74) *Attorney, Agent, or Firm* — Alleman Hall Creasman & Tuttle LLP

(57) ABSTRACT

The present disclosure provides an image generating device that includes processing circuitry configured to acquire positional information indicative of a position of a water-surface movable body where an imaging device is to be installed, acquire posture information indicative of a posture of the water-surface movable body, acquire additional display information including information indicative of positions of a plurality of locations, generate three-dimensional display data for displaying a graphic indicative of the additional display information by superimposedly placing the graphic on a water surface portion of an image outputted from the imaging device based on the positional information, the posture information, and the positions of the plurality of locations included in the additional display (Continued)

information, and output the graphic rendering the three-dimensional display data.

16 Claims, 11 Drawing Sheets

(51) Int. Cl.
 *G06T 15/20* (2011.01)
 *G06T 19/20* (2011.01)
(52) U.S. Cl.
 CPC .. *G06T 2200/24* (2013.01); *G06T 2219/2004* (2013.01); *G06T 2219/2016* (2013.01)

(56) References Cited

U.S. PATENT DOCUMENTS

| | | | |
|---|---|---|---|
| 8,296,001 B1* | 10/2012 | Kabel | G01C 21/22 701/21 |
| 2003/0210228 A1* | 11/2003 | Ebersole | G06F 3/147 345/157 |
| 2007/0222665 A1* | 9/2007 | Koeneman | G08G 5/0021 342/29 |
| 2012/0158287 A1 | 6/2012 | Altamura et al. | |
| 2012/0290200 A1 | 11/2012 | Kabel et al. | |
| 2014/0160165 A1 | 6/2014 | Kim et al. | |
| 2015/0015712 A1* | 1/2015 | Sempuku | G08G 1/166 348/148 |
| 2015/0330803 A1 | 11/2015 | Okuda et al. | |
| 2015/0330804 A1* | 11/2015 | Okuda | G01C 21/3664 701/487 |
| 2015/0350552 A1 | 12/2015 | Pryszo et al. | |
| 2017/0160393 A1* | 6/2017 | Gatland | G01S 7/6281 |
| 2019/0251356 A1* | 8/2019 | Rivers | G06T 3/60 |
| 2020/0018848 A1* | 1/2020 | Rivers | B63B 49/00 |
| 2020/0057488 A1* | 2/2020 | Johnson | G01C 21/005 |

FOREIGN PATENT DOCUMENTS

| | | |
|---|---|---|
| JP | H10206178 A | 8/1998 |
| JP | 2005289264 A | 10/2005 |
| JP | 2007286725 A | 11/2007 |
| JP | 2012127947 A | 7/2012 |
| JP | 2015164006 A | 9/2015 |
| JP | 2015215532 A | 12/2015 |
| JP | 2016082586 A | 5/2016 |
| JP | 2016097925 A | 5/2016 |

OTHER PUBLICATIONS

Jaeyong, O. H., Sekil Park, and Oh-Seok Kwon. "Advanced navigation aids system based on augmented reality." International Journal of e-Navigation and Maritime Economy 5 (2016): 21-31. (Year: 2016).*
Hugues, Olivier, Jean-Marc Cieutat, and Pascal Guitton. "An experimental augmented reality platform for assisted maritime navigation." Proceedings of the 1st Augmented Human International Conference. 2010. (Year: 2010).*
Morgère, Jean-Christophe, Jean-Philippe Diguet, and Johann Laurent. "Electronic navigational chart generator for a marine mobile augmented reality system." 2014 Oceans—St. John's. IEEE, 2014. (Year: 2014).*
Morgère, Jean Christophe, Jean Philippe Diguet, and Johann Laurent. "Mobile Augmented Reality System for marine navigation assistance." 2014 12th IEEE International Conference on Embedded and Ubiquitous Computing. IEEE, 2014. (Year: 2014).*
De Vlaming, A. et al., "Augmented reality used in navigation. Project 2, Theme: improvement and innovation," Netherlands Maritime University, Feb. 5, 2013, 25 pages.
Wisernig, E. et al., "Augmented Reality Visualization for Sailboats (ARVS)," Proceedings of 2015 International Conference on Cyberworlds, Oct. 7, 2015, Visby, Sweden, 8 pages.
European Patent Office, Extended European Search Report Issued in Application No. 18806061.0, dated Dec. 21, 2020, 9 pages.
International Bureau of WIPO, International Preliminary Report on Patentability Issued in Application No. PCT/JP2018/018645, Dec. 5, 2019 WIPO, 22 pages.

* cited by examiner

IMAGE GENERATING DEVICE FOR GENERATING THREE-DIMENSIONAL DISPLAY DATA

CROSS-REFERENCE TO RELATED APPLICATION

This application is a continuation-in-part of PCT International Application PCT/JP2018/018645, which was filed on May 15, 2018, and which claims priority to Japanese Patent Application Ser. No. 2017-103148 filed on May 24, 2017, the entire disclosures of each of which are herein incorporated by reference for all purposes.

TECHNICAL FIELD

The present disclosure relates to an image generating device. In detail, the present disclosure relates to an image generating device which generates an image indicative of a situation around a water-surface movable body.

BACKGROUND

For example, this kind of image generating device is disclosed in Patent Document 1. The image generating device of Patent Document 1 includes a camera, an imaging data receiving part, a position acquiring part, an image generating part, a target object display item generating part, and a display unit, and is configured to perform geo-referencing of the image stream from the camera.

In Patent Document 1, the imaging data receiving part receives the stream image data imaged by the camera of a ship. The position acquiring part acquires the position of a target object around the ship (another ship etc.). The image generating part generates an image to be displayed on the display unit based on the image of the stream image data. The image supports the position and the view of the camera. The target object display item generating part generates a target object display item indicative of the target object at a point on the image. The display is configured to display the image, and the target object display item placed at the point on the image.

The image generating part generates the image by projecting the image on a three-dimensional virtual space in which points correspond to the points on the image, and the environment around the water-surface movable body is indicated. Further, the target object display item generating part generates the target object display item based on positional information on the target object, and the points of the three-dimensional virtual space.

REFERENCE DOCUMENT OF CONVENTIONAL ART

Patent Document

Patent Document 1 US2015/0350552A1

However, Patent Document 1 only discloses that the target object display item is displayed at the points on the image corresponding to the positional information on the target object, but does not disclose, for example, how the target object display item is displayed on the image in order to realize facilitate viewing. Therefore, there is room for a further improvement.

Moreover, with the configuration of Patent Document 1, a change in the posture of the imaging device caused when the water-surface movable body is shaken by a wave etc. is not particularly considered. As a result, there is a possibility that the display position of the target object display item on the image becomes unnatural.

The present disclosure is made in view of the above situations, and one purpose thereof is to provide an image generating device which displays a situation around a water-surface movable body with an easy-to-view and natural impression.

SUMMARY

The problem to be solved by the present disclosure is as described above, and means to solve the problem and the effect thereof is described below.

According to one aspect of the present disclosure, an image generating device with the following configuration is provided. That is, the image generating device, comprising processing circuitry configured to acquire positional information indicative of a position of a water-surface movable body where an imaging device is to be installed, acquire posture information indicative of a posture of the water-surface movable body, acquire additional display information including information indicative of positions of a plurality of locations, generate three-dimensional display data for displaying a graphic indicative of the additional display information by superimposedly placing the graphic on a water surface portion of an image outputted from the imaging device based on the positional information, the posture information, and the positions of the plurality of locations included in the additional display information, and output the graphic rendering the three-dimensional display data.

According to this configuration, based on the position and the posture of the water-surface movable body, the three-dimensional display indicative of the position etc. of the additional display information can be outputted as the graphic. Therefore, a virtual-reality synthesized image can be realized by displaying the graphic placed on the captured image. The user may look at this synthesized image, and it may become easy to intuitively grasp the situation indicated by the additional display information, as well as the spatial relationship. Moreover, by the display in which the graphics of the additional display information are placed along the water surface in the captured image, the user can intuitively grasp the relation between the plurality of locations.

The image generating device may have the following configuration. That is, the route is generated by connecting way points to be set by the user, and the processing circuitry is further configured to generate the three-dimensional display data for displaying a graphic indicative of the way points, together with the graphic indicative of the route.

According to one aspect of the present disclosure, a method of generating an image with the following configuration is provided. That is, the method of generating an image, comprising, acquiring positional information indicative of a position of a water-surface movable body where an imaging device is to be installed, acquiring posture information indicative of a posture of the water-surface movable body, acquiring additional display information including information indicative of positions of a plurality of locations, generating three-dimensional display data for displaying a graphic indicative of the additional display information by superimposedly placing the graphic on a water surface portion of an image outputted from the imaging device based on the positional information, the posture information, and the positions of the plurality of locations included in the additional display information, and outputting the graphic rendering the three-dimensional display data.

DETAILED DESCRIPTION

Figure 1:
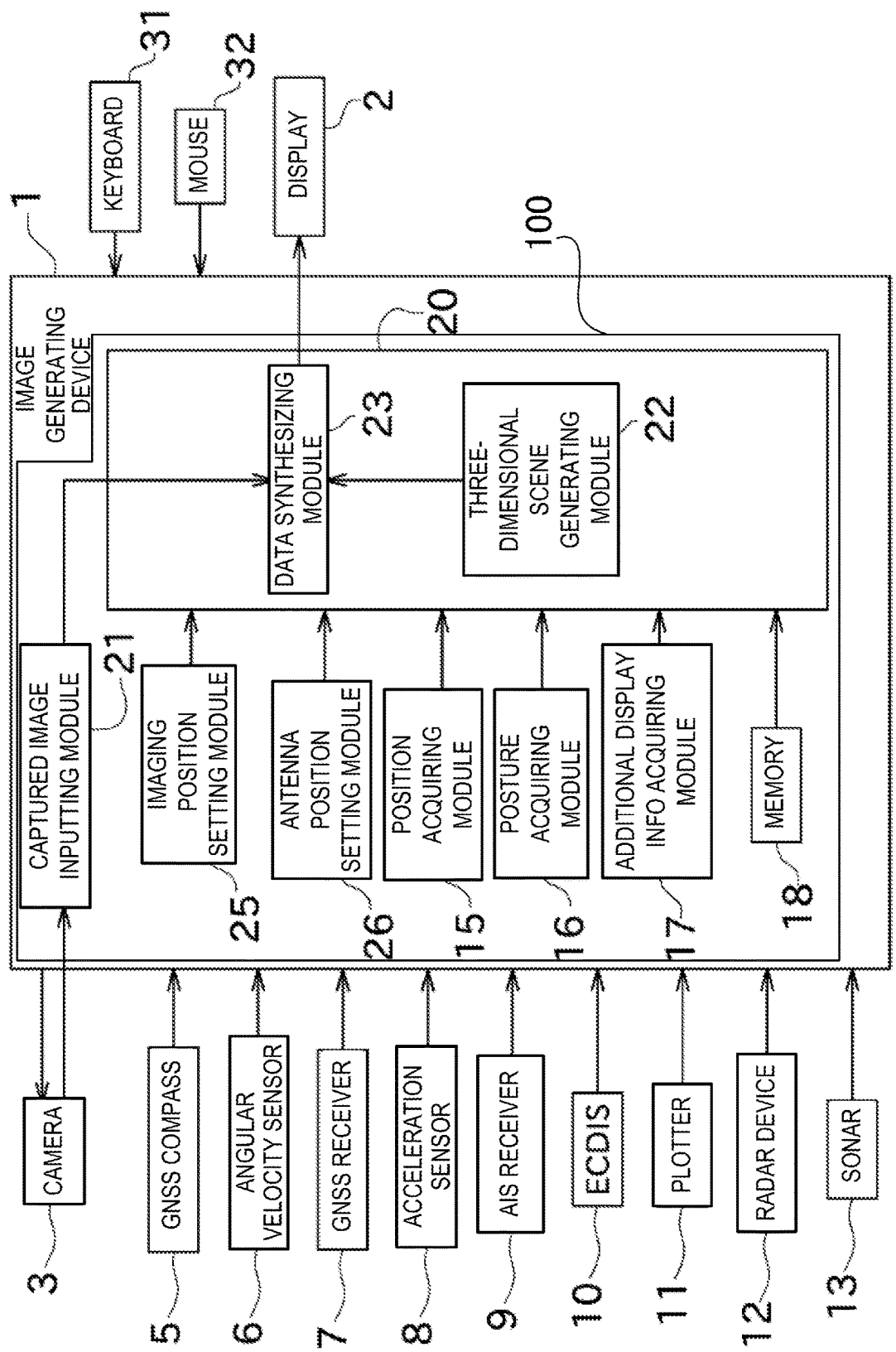
FIG. 1 is a block diagram illustrating the entire configuration of an image generating device according to one embodiment of the present disclosure.
Figure 2:
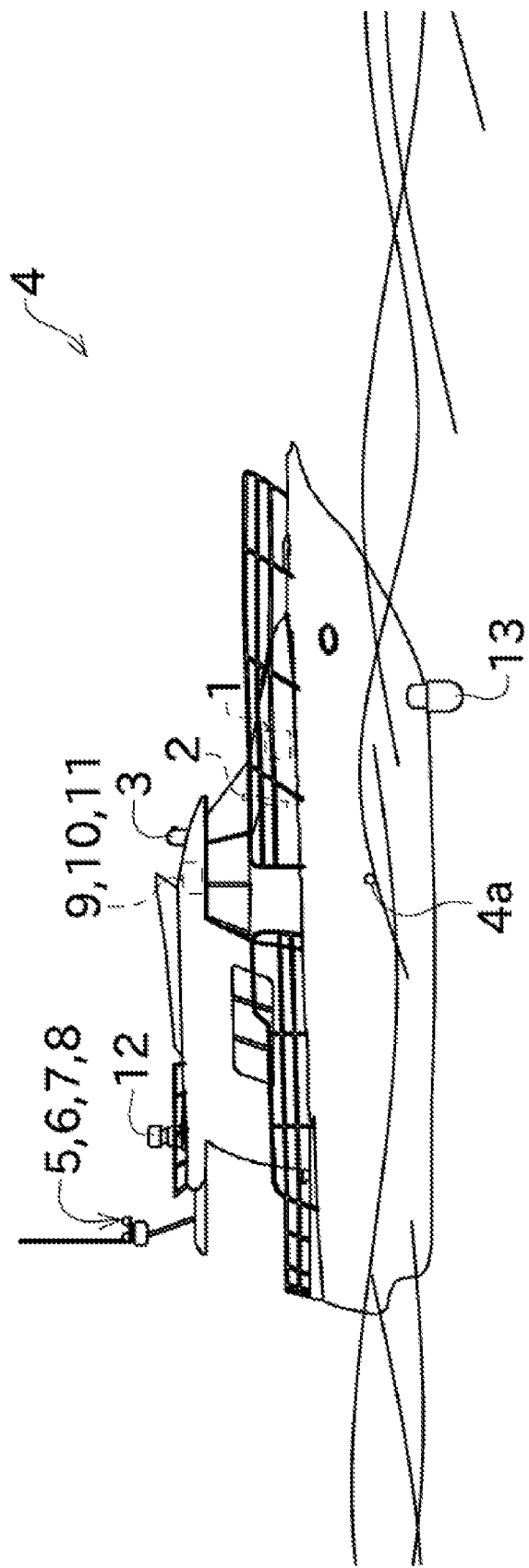
FIG. 2 is a side view illustrating various kinds of instruments mounted on a ship.

Next, one embodiment of the present disclosure is described with reference to the drawings. FIG. 1 is a block diagram illustrating the entire configuration of an image generating device 1 according to one embodiment of the present disclosure. FIG. 2 is a side view illustrating various kinds of instruments mounted on a ship 4.

The image generating device 1 illustrated in FIG. 1 may be a device which is mounted on the ship (water-surface movable body) 4 as illustrated, for example, in FIG. 2, and may generate an image expressing the situation around the ship 4 in virtual reality based on the image captured by a camera (imaging device) 3. The image generated by the image generating device 1 may be displayed on a display unit 2.

The display unit 2 may be configured as, for example, a display unit for a navigation assisting device to which a ship operator who operates the ship 4 refers. However, the display unit 2 is not limited to the above configuration, and, for example, it may be a display unit for a portable computer which is carried by a ship operator's assistant who monitors the surrounding situation from the ship 4, a display unit for a passenger to watch in the cabin of the ship 4, or a display part for a head mounted display, such as a wearable glass, worn by a passenger.

The image generating device 1 may generate a synthesized image which is an output image to the display unit 2 by synthesizing the image around the ship 4 imaged by the camera 3 installed in the ship 4, and graphics which expresses additional display information on the perimeter of the ship 4 in virtual reality (as will be described in detail later).

Next, mainly referring to FIG. 1, the camera 3 and various kinds of ship instruments which may be electrically connected to the image generating device 1 are described.

The camera 3 may be configured as a wide-angle video camera which images the perimeter of the ship 4. This camera 3 may have a live output function, capable of generating video data (image data) as the imaged result on real time, and outputting it to the image generating device 1. As illustrated in FIG. 2, the camera 3 may be installed in the ship 4 so that an imaging direction becomes horizontally forward of the hull.

The camera 3 may be attached to the ship 4 through a rotating mechanism (not illustrated), and, therefore, the imaging direction can be changed in a given angle range on the basis of the hull of the ship 4 by inputting a signal for instructing pan/tilt from the image generating device 1. Moreover, since the height and the posture of the ship 4 variously change due to waves etc., the height of the camera 3 may change in connection with the change, and the posture (imaging direction) may also change three-dimensionally.

The image generating device 1 of this embodiment may be electrically connected to, in addition to the camera 3, a GNSS compass (a direction sensor, a posture sensor) 5, an angular velocity sensor 6, a GNSS receiver 7, an acceleration sensor 8, an AIS receiver 9, an ECDIS 10, a plotter 11, a radar device 12, and a sonar 13, etc. as the ship instrument.

The GNSS compass 5 may be provided with a plurality of GNSS antennas (positioning antenna) fixed to the ship 4. The GNSS compass 5 may calculate spatial relationships of the GNSS antennas based on radio waves received from positioning satellites. Particularly, the GNSS compass 5 of this embodiment may be configured to obtain the spatial relationships of the GNSS antennas based on phase differences of carrier phases of the radio waves received by the respective GNSS antennas (since this processing is known, detailed description thereof is omitted). Therefore, a bow direction of the ship 4 can be acquired with sufficient accuracy.

The GNSS compass 5 may acquire the posture of the ship 4 three-dimensionally. In other words, the GNSS compass 5 may detect a roll angle and a pitch angle of the ship 4, as well as the bow direction (i.e., yaw angle of the ship 4). The posture information on the ship 4 acquired by the GNSS compasses 5 may be outputted to a posture acquiring module 16 of the image generating device 1, and other ship instruments utilizing the posture information.

The angular velocity sensor 6 may be, for example, comprised of a known oscillating gyroscope sensor, which is capable of detecting a yaw angular velocity, a roll angular velocity, and a pitch angular velocity of the ship 4 at a cycle shorter than a posture detection interval of the GNSS compass 5 (e.g., 1 second). By using both an angle detected by the GNSS compass 5 and an integrated value of the angular velocity detected by the angular velocity sensor 6, the posture of the ship 4 can be acquired at a time interval shorter than the case where only the GNSS compass 5 is used. Moreover, the angular velocity sensor 6 may function as an alternative for acquiring the posture information, when the radio wave from the positioning satellite is interrupted with an obstacle, such as a bridge, and the posture becomes undetectable by the GNSS compass 5.

The GNSS receiver 7 may find the position of the ship 4 (in detail, a latitude, a longitude, and a height of the GNSS antenna) based on the radio waves which the GNSS antennas received from the positioning satellites. The GNSS receiver 7 may output the acquired positional information to a position acquiring module 15 of the image generating device 1, and/or other ship instruments utilizing the positional information.

The acceleration sensor 8 may be configured, for example, as a known capacitance detection type sensor, which is capable of detecting accelerations about the yaw axis, the roll axis, and the pitch axis of the ship 4 at a cycle shorter than a position detection interval of the GNSS receiver 7 (e.g., 1 second). By using both the position detected by the GNSS receiver 7, and a double integrated value of the acceleration detected by the acceleration sensor 8, the position of the ship 4 can be acquired at a time interval shorter than the case where only the GNSS receiver 7 is used. Moreover, the acceleration sensor 8 may function as an alternative for acquiring the positional information, when the radio wave from the positioning satellite is interrupted, and the detection of the position is impossible by the GNSS receiver 7.

In this embodiment, as illustrated in FIG. 2, the angular velocity sensor 6, the GNSS receiver 7, and the acceleration sensor 8 may be built in the GNSS compass 5. However, some or all of the angular velocity sensor 6, the GNSS receiver 7, and the acceleration sensor 8 may be provided independently from the GNSS compass 5.

The AIS receiver 9 may receive AIS information transmitted from another ship, a land station, etc. The AIS information may include various information, such as a position (latitude and longitude) of another ship which travels around the ship 4, a length and a width of another ship, and a type and identifying information of another ship, a ship speed, a course, a destination of another ship, and a position and identifying information of a landmark.

The ECDIS 10 may acquire the positional information on the ship 4 from the GNSS receiver 7 and output the information on the perimeter of the ship 4 to the image generating device 1 based on electronic nautical chart information stored beforehand.

The plotter 11 may generate information on a traveling trail of the ship 4 by continuously acquiring the position of the ship 4 from the GNSS receiver 7. Moreover, by allowing a user to set a plurality of waypoints (points through which the ship 4 is scheduled to pass), the plotter 11 can generate a scheduled route by sequentially connecting these waypoints.

The radar device 12 may detect a target object, such as another ship, which exists around the ship 4. Moreover, the radar device 12 may have a known target tracking function (Target Tracking, TT) which can acquire and track the target object, and can find a position and a velocity vector (TT information) of the target object.

The sonar 13 may detect a school of fish etc. by transmitting an ultrasonic wave underwater and receiving a reflective wave which is the ultrasonic wave reflected on the school of fish etc.

The image generating device 1 may be connected to a keyboard 31 and a mouse 32 which the user operates. The user can perform various kinds of instructions about generation of an image by operating the keyboard 31 and the mouse 32. The instructions may include the pan/tilt operation of the camera 3, and a setup of a viewpoint of a synthesized image.

Next, a configuration of the images generating device 1 is described in detail mainly referring to FIG. 1.

As illustrated in FIG. 1, the image generating device 1 may include a captured image inputting module 21, a position acquiring module 15, the posture acquiring module 16, an additional display information acquiring module 17, a memory 18, an imaging position setting module 25, an antenna position setting module 26, and a synthesized image generating module 20.

In detail, although the image generating device 1 is configured as a known computer (which is also referred to as processing circuitry 100) and is not illustrated, it may include a CPU, a ROM, a RAM, and a HDD. Further, the image generating device 1 may be provided with a GPU for performing three-dimensional image processing (described later) at high speed. The HDD stores, for example, software for performing image synthesizing processing of the present disclosure. By collaboration of the hardware and the software, the image generating device 1 may be functioned as the captured image inputting module 21, the position acquiring module 15, the posture acquiring module 16, the additional display information acquiring module 17, the memory 18, the imaging position setting module 25, the antenna position setting module 26, the synthesized image generating module 20, etc.

The captured image inputting module 21 may accept an input of image data outputted from the camera 3, for example, at 30 frames per second. The captured image inputting module 21 may output the inputted image data to the synthesized image generating module 20 (a data synthesizing module 23 described later).

The position acquiring module 15 may acquire the current position of the ship 4 on real time based on the detection results of the GNSS receiver 7 and the acceleration sensor 8.

The posture acquiring module 16 may acquire the current posture of the ship 4 on real time based on the detection results of the GNSS compass 5 and the angular velocity sensor 6.

Figure 3:
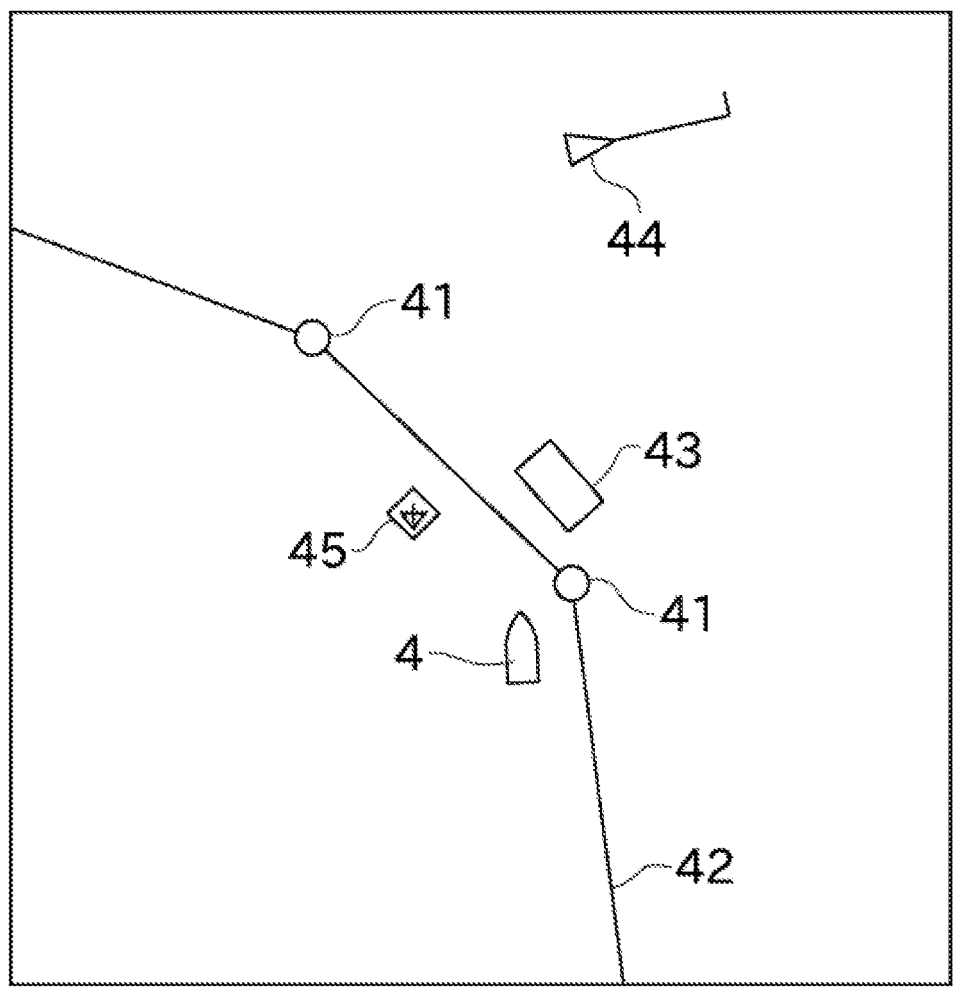
FIG. 3 is a conceptual diagram illustrating one example of the additional display information to be displayed in the image generating device.

The additional display information acquiring module 17 may acquire information to be displayed in addition to the image captured by the camera 3 (additional display information) based on information outputted to the image generating device 1 from the AIS receiver 9, the ECDIS 10, the plotter 11, the radar device 12, the sonar 13, etc. Although various information can be considered as the additional display information, the information may be, for example, about a route line 42 set as the scheduled route of the ship 4 as illustrated in FIG. 3. Note that, the details of the additional display information will be described later.

The memory 18 of FIG. 1 may be configured as a memory which stores various kinds of information. The memory 18 may store three-dimensional shapes of virtual reality objects expressing various kinds of the additional display information as templates. Although the templates of the three-dimensional shapes stored in the memory 18 may be, for example, a small ship or boat, a large-sized ship or vessel, a buoy, a lighthouse, etc., they are not limited to these examples.

The imaging position setting module 25 may set the position of the camera 3 in the ship 4 (imaging position), specifically, the position of the camera 3 in the longitudinal direction and the width direction of the ship, and the position of the camera in the vertical direction (the height of the camera 3). Although the height of the camera 3 may be a height from a waterline normally assumed in the ship 4, it is not limited to this height and it may also be, for example, a height from the ship's bottom. This setup of the imaging position can be performed, for example, by the user operating the keyboard 31, the mouse 32, etc. to input the result of an actual measurement of the position of the camera 3.

The antenna position setting module 26 may set the position of the GNSS antenna in the ship 4 (antenna position). This antenna position can be, for example, positions in the longitudinal direction, the width direction, and the vertical direction of the ship with respect to a reference point 4a set in the ship 4 as a reference of control as illustrated in FIG. 2. Although this reference point 4a may be defined variously, it may be defined at a position at the center of the hull of the ship 4 and at the same height as the waterline normally assumed, in this embodiment. The setup of the antenna position may be performed, for example, by inputting an actual measurement value, similar to the imaging position described above.

The position acquiring module 15, the posture acquiring module 16, the additional display information acquiring module 17, the memory 18, the imaging position setting module 25, and the antenna position setting module 26 may output the acquired, stored, or set information to the synthesized image generating module 20.

The synthesized image generating module 20 may generate a synthesized image to be displayed on the display unit 2. The synthesized image generating module 20 may include a three-dimensional scene generating module (display data generating module) 22, and the data synthesizing module (display outputting module) 23.

Figure 4:
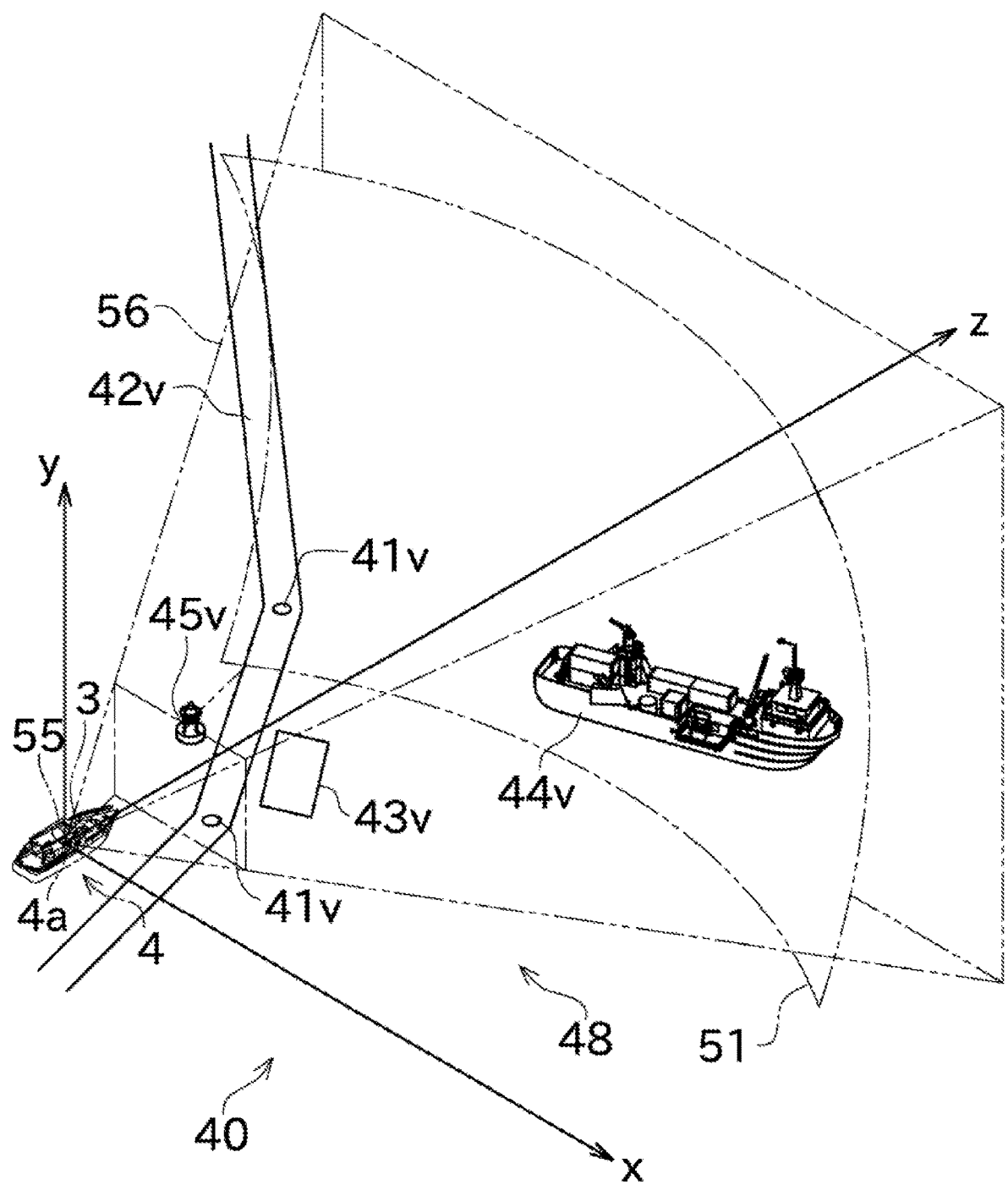
FIG. 4 is a conceptual diagram illustrating three-dimensional scene data generated so that virtual reality objects are placed in a three-dimensional virtual space, and a projection screen placed in the three-dimensional virtual space.

As illustrated in FIG. 4, the three-dimensional scene generating module 22 may establish a three-dimensional scene of virtual reality by placing virtual reality objects 41v, 42v, . . . corresponding to the additional display information in a three-dimensional virtual space 40. Therefore, a three-dimensional scene data (three-dimensional display data) 48 which is data of the three-dimensional scene may be generated. Note that the details of the three-dimensional scene will be described later.

Figure 6:
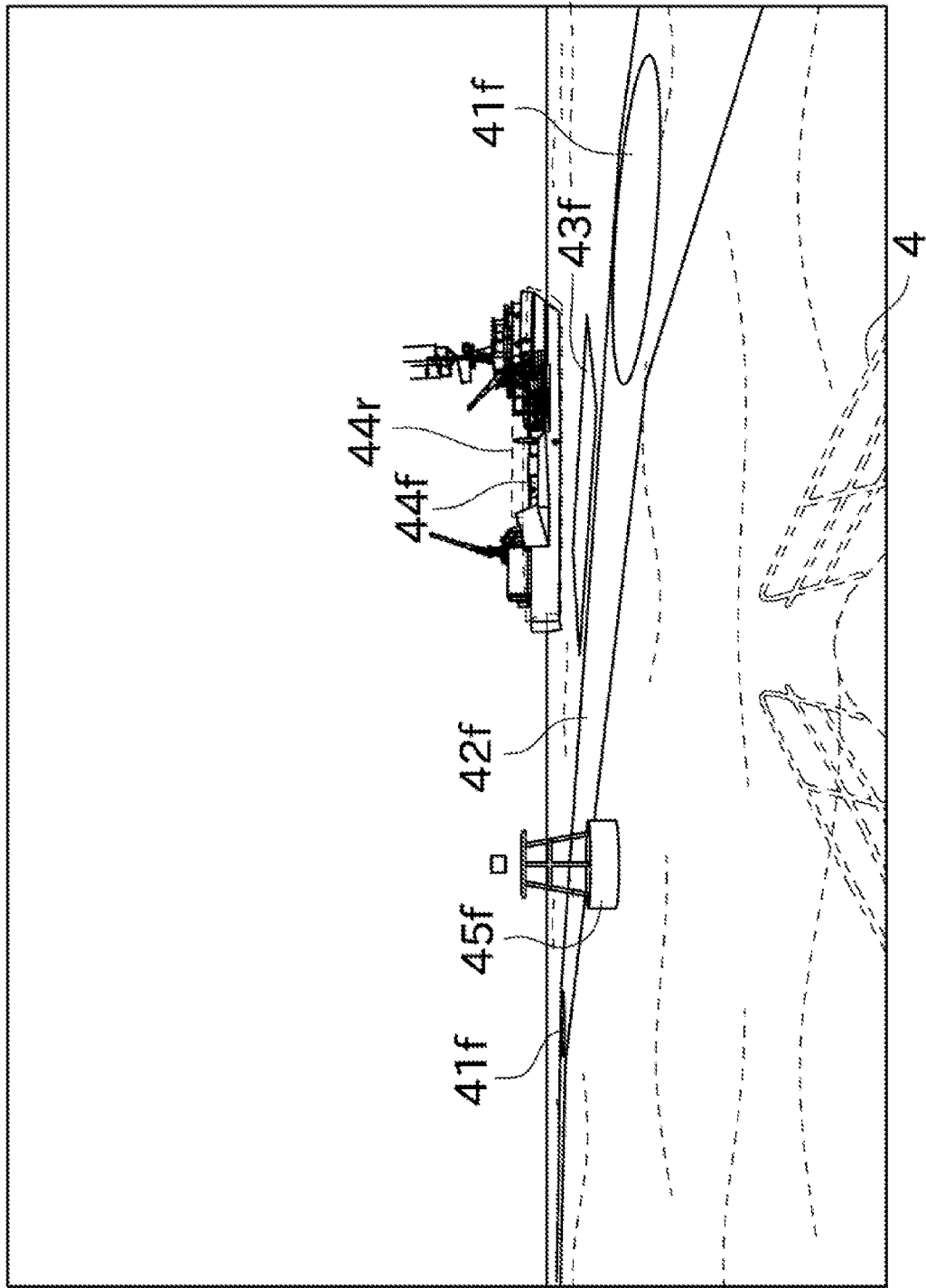
FIG. 6 is a view illustrating a synthesized image outputted from a data synthesizing module.

The data synthesizing module 23 may generate a graphic which three-dimensionally expresses the additional display information by rendering the three-dimensional scene data 48 generated by the three-dimensional scene generating module 22. The data synthesizing module 23 may also output a synthesized image as illustrated in FIG. 6, i.e., the image synthesized the graphics 41f, 42f, . . . with the captured image of the camera 3. As illustrated in FIG. 6, in this synthesized image, the graphics 41f, 42f, . . . indicative of the additional display information may be placed on a sea surface image captured by the camera 3 (illustrated in this figure by broken lines for convenience of description) in a superimposed fashion. The data synthesizing module 23 may output the generated synthesized image to the display unit 2. Note that the details of generation of the graphics and the data synthesizing will be described later.

Next, the additional display information described above acquired by the additional display information acquiring module 17 is described in detail. FIG. 3 is a conceptual diagram illustrating one example of the additional display information to be displayed in the image generating device 1.

The additional display information may be information displayed in addition to the image captured by the camera 3, and may be various items according to the purpose and the function of the ship instruments connected to the image generating device 1. For example, as for the AIS receiver 9, the received AIS information (e.g., the position and the direction of another ship, the position of a buoy, and the position of a virtual buoy) may be the additional display information. As for the ECDIS 10, the additional display information may be a position of a dangerous water area, a traveling prohibited area, a lighthouse, or a buoy contained in the electronic nautical chart. As for the plotter 11, the additional display information may be a position of a recorded trace of the ship 4, a scheduled route setting, a waypoint, an arrival area (an area indicative of a destination), and a stopping area (an area indicative of a stopping location (which is also referred to as drop-in location)). As for the radar device 12, the additional display information may be a position, a speed, etc. of a detected target object. As for the sonar 13, a position of a detected school of fish may be the additional display information. These information may be inputted on real time into the image generating device 1 from the ship instruments. The additional display information acquiring module 17 may assign identifying information (e.g., an identification number) for uniquely identifying and managing each of the inputted additional display information.

In FIG. 3, one example of the additional display information located around the ship 4 is illustrated. In FIG. 3, on the sea surface (on the water surface), waypoints 41 indicative of the destination, and the route line 42 in the shape of a polygonal line indicative of the scheduled route to the destination may be defined. Moreover, near the route line 42, a polygon-shaped (rectangular shape) stopping area 43 may be defined. The waypoint 41, the route line 42, and the stopping area 43 may be set by the user suitably operating the plotter 11 beforehand to specify the position of each location.

Moreover, in the example of FIG. 3, it may be detected using the AIS information acquired by the AIS receiver 9 that another ship 44 is traveling to the right of the ship 4 at a location a little distant forward from the ship 4, and a virtual buoy 45 is located near, forward and left side of the ship 4. Note that, although the virtual buoy is not actually provided on the sea due to situations, such as a difficulty of installation, it may mean an imaginary buoy (intangible) displayed as a label or marker in the screen of a navigation device.

Each additional display information may include information at least indicative of the position (latitude and longitude) of one or more locations on the sea surface (water surface) at which it is placed. For example, the additional display information indicative of the route line 42 includes information on positions of two locations used as bends of the polygonal line (the positions of the locations of the bends correspond to the positions of the waypoint 41). The additional display information on the stopping area 43 may include information at the position of each location used as a vertex of the polygon. Moreover, the additional display information indicative of another ship 44 may include information indicative of the position of another ship 44.

Next, the establishment of the three-dimensional scene by the three-dimensional scene generating module 22, and the synthesizing of the images by the data synthesizing module 23 are described in detail referring to FIG. 4. FIG. 4 is a conceptual diagram illustrating the three-dimensional scene data 48 which is generated by placing the virtual reality objects 41v, 42v, . . . on the three-dimensional virtual space 40, and a projection screen 51 placed on the three-dimensional virtual space 40.

As illustrated in FIG. 4, the three-dimensional virtual space 40 where virtual reality objects 41v, 42v, . . . are placed by the three-dimensional scene generating module 22 may be configured in a rectangular coordinate system which uses a suitable reference position of the ship 4 (e.g., the reference point 4a described above) as the origin, where an xz plane which is a horizontal plane imitates the sea surface (water surface). In the example of FIG. 4, the axis of coordinates may be set such that the +z direction is always in agreement with the bow direction, the +x direction is in agreement with the rightward, and the +y direction is in agreement with upward. Each location (coordinates) in the three-dimensional virtual space 40 may be set so as to correspond to the actual position around the ship 4.

In FIG. 4, one example where the virtual reality objects 41v, 42v, 43v, 44v, and 45v are placed in the three-dimensional virtual space 40, in order to express the situation around the ship 4 illustrated in FIG. 3, is illustrated. Each of the virtual reality objects 41v, 42v, 43v, 44v, and 45v may be placed so that it contacts the xz plane to reflect a relative position of the additional display information indicated by the virtual reality object with respect to the ship 4 on the basis of the bow direction. Upon determining the positions where these virtual reality objects 41v, 42v, . . . are placed, a calculation using the positions of the GNSS antennas set by the antenna position setting module 26 illustrated in FIG. 1 may be performed.

The virtual reality object 44v indicative of another ship 44 may have the shape of a ship, and may be expressed using a template of the model of a large-sized ship stored beforehand in the memory 18. Moreover, the direction of the model may be oriented so as to indicate the direction of another ship 44 acquired from the AIS information. Note that, based on the information on the length and the width of another ship acquired from the AIS information, the model of the original template may be deformed (either enlarged or shrunk) in the longitudinal direction and the width direction of the ship.

The virtual reality object 45v indicative of the virtual buoy 45 may be expressed using a template of the model of a buoy stored beforehand in the memory 18, similar to the virtual reality object 44v of another ship 44.

The virtual reality object 41v of the waypoint 41 may be expressed three-dimensionally in the shape of a thin disk. The virtual reality object 42v of the route line 42 may be expressed three-dimensionally in the shape of a polygonal line comprised of strip plates having a certain thickness and a certain width. The virtual reality object 43v of the stopping area 43 may be expressed three-dimensionally in the shape of a plate having a certain thickness and having a contour of the stopping area 43. For these virtual reality objects 41v, 42v, and 43v, the three-dimensional shapes may be created each time, without using the templates of the models.

The three-dimensional scene generating module 22 may generate the three-dimensional scene data 48 as described above. In the example of FIG. 4, since the virtual reality objects 41v, 42v, . . . are placed on the basis of azimuth from the position of the ship 4 as the origin, when the position of the ship 4 (positions in the east-and-west direction and the north-and-south direction) changes from the state of FIG. 3, or when the bow direction changes due to a turn etc., a new three-dimensional scene where the virtual reality objects 41v, 42v, . . . are rearranged may be established, and the three-dimensional scene data 48 may then be updated. Moreover, for example, when the contents of the additional display information are changed due to traveling of another ship 44 from the state of FIG. 3, the three-dimensional scene data 48 may be updated so that the latest additional display information is reflected.

Then, the data synthesizing module 23 may place in the three-dimensional virtual space 40 the projection screen 51 which defines the position and the area where the captured image of the camera 3 is projected. The synthesizing of the images can be realized by setting the position and the direction of a viewpoint camera 55 described below so that both the projection screen 51 and the virtual reality objects 41v, 42v, . . . are contained in the view of the camera 55.

The data synthesizing module 23 may simulate in the three-dimensional virtual space 40 the position and the direction of the camera 3 mounted on the ship 4, and place the projection screen 51 so as to directly oppose to the camera 3. For the simulation of the position of the camera 3, the position of the camera 3 on the basis of the hull can be obtained based on the setting value of the imaging position setting module 25 illustrated in FIG. 1.

Upon the simulation of the position and the direction of the camera 3, the change in the direction of the camera 3 by the pan/tilt operation described above may be taken into consideration. Further, the simulation may be performed so that the change in the position and the direction of the camera 3 due to the change in the posture and the height of the ship 4 are reflected based on the positional information and the posture information acquired by the position acquiring module 15 and the posture acquiring module 16. The data synthesizing module 23 may interlock with the change in the position and the direction of the camera 3 to change the position and the direction of the projection screen 51 placed in the three-dimensional virtual space 40.

Then, the data synthesizing module 23 may generate a two-dimensional image by performing known rendering to the three-dimensional scene data 48 and the projection screen 51. In more detail, the data synthesizing module 23 may place the viewpoint camera 55 in the three-dimensional virtual space 40, and define a frustum (visual cone) 56 which defines an area to be rendered so that the viewpoint camera 55 is used as a vertex and its line-of-sight direction becomes the center axis. Then, the data synthesizing module 23 may convert coordinates of a vertex of the polygon located inside the frustum 56 among the polygons which constitute each object (one of the virtual reality objects 41v, 42v, . . . , and the projection screen 51) into coordinates of the two-dimensional virtual screen corresponding to the display area of the synthesized image in the display unit 2 by a perspective projection. Then, based on the vertex placed on the virtual screen, a two-dimensional image may be generated by generating and processing pixels at a given resolution.

The two-dimensional image generated in this way may include graphics obtained by rendering the three-dimensional scene data 48 (in other words, the graphics as results of rendering the virtual reality objects 41v, 42v, . . . ). Moreover, during the generation of the two-dimensional image, the captured image of the camera 3 may be placed so as to be pasted at the position corresponding to the projection screen 51. Therefore, the synthesizing of the images by the data synthesizing module 23 may be realized. Since the projection screen 51 has a curved shape so as to conform to a spherical shell centering on the camera 3, it can prevent distortion of the captured image by the perspective projection.

The viewpoint camera 55 may define a viewpoint of the synthesized image, and its position and direction can be set by the user using, for example, the keyboard 31 and the mouse 32. However, the data synthesizing module 23 may set a mode when generating the synthesized image as a mode in which the position and the direction of the viewpoint camera 55 change automatically so that they are always in agreement with the position and the direction of the camera 3 (viewpoint tracking mode). In this viewpoint tracking mode, since the entire view of the viewpoint camera 55 is always covered by the projection screen 51 (i.e., the captured image of the camera 3), the realistic synthesized image with presence can be realized.

On the other hand, the data synthesizing module 23 may also set it to a mode in which the position and the direction of the viewpoint camera 55 are set, without depending on the position and the direction of the camera 3 (independent viewpoint mode). In this independent viewpoint mode, the user can confirm the additional display information located at a position deviated from the capturing view of the camera 3.

Figure 5:
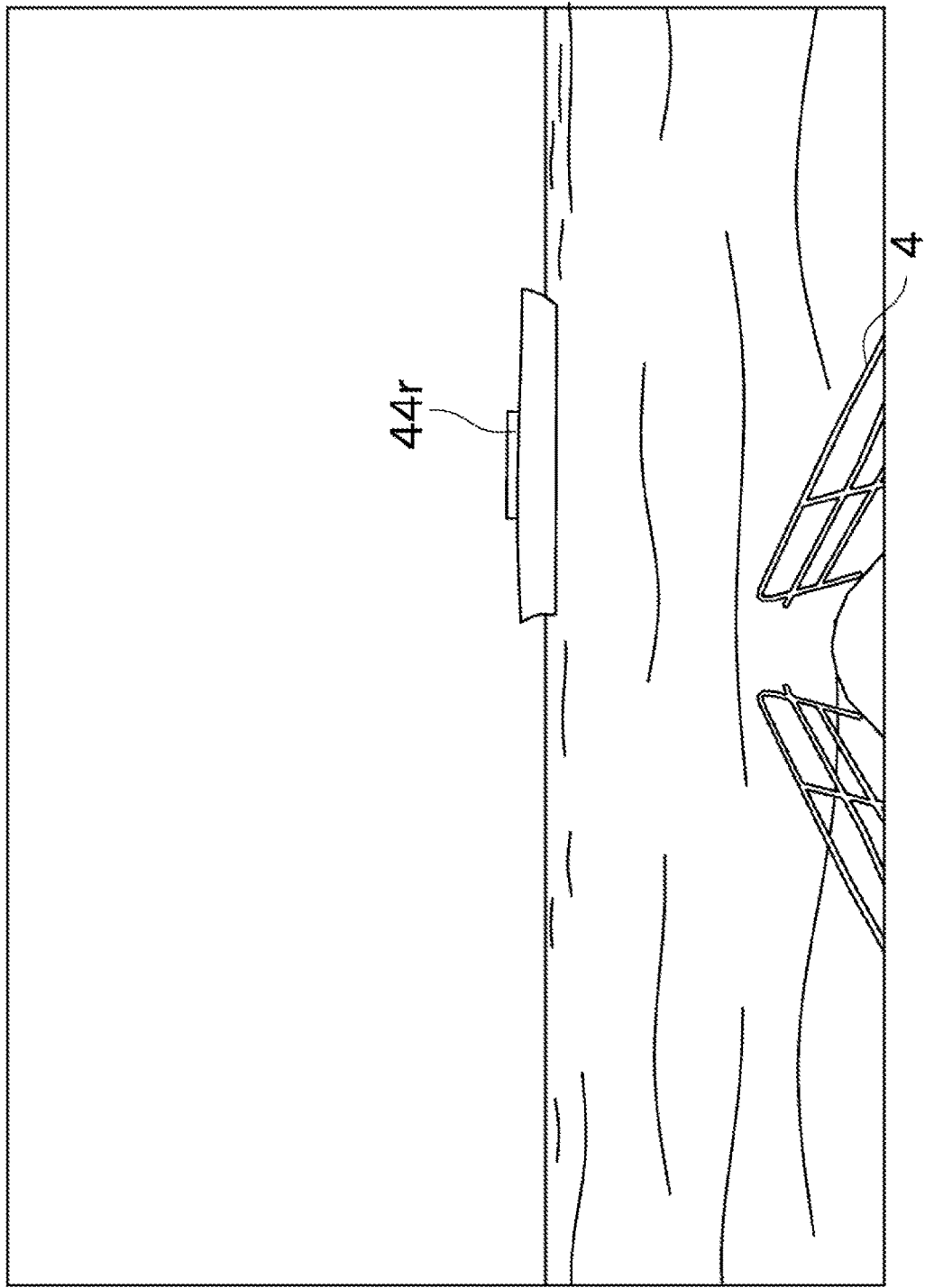
FIG. 5 is a view illustrating one example of a captured image by a camera.

Next, a relation between the image captured by the camera 3 and the synthesized image is described referring to one example. FIG. 5 is a view illustrating one example of the image captured by the camera 3. FIG. 6 is a view illustrating the synthesized image outputted from the data synthesizing module 23.

In FIG. 5, one example of the image imaged by the camera 3 of the ship 4 in the situation indicated in FIG. 3 is illustrated. Another ship 44r floating on the sea surface is in the captured image. Moreover, a bow part of the ship 4 is located at the lower center of the image.

Since the virtual buoy 45 is virtual as described above, it will not be caught by the camera 3, as illustrated in FIG. 5. Since the waypoint 41, the route line 42, and the stopping area 43 are also created by the setup of the plotter 11, they will not appear in the image captured by the camera 3.

FIG. 6 illustrates a result of synthesizing the two-dimensional image obtained by rendering the three-dimensional scene data 48 in FIG. 4 with the captured image illustrated in FIG. 5. However, in FIG. 6, the parts which appear in the image captured by the camera 3 are illustrated by broken lines for convenience in order to facilitate the distinction from other parts (similar processing is also applied to other views indicating the synthesized image). In the synthesized image of FIG. 6, the graphics 41f, 42f, 43f, 44f, and 45f expressing the additional display information are placed so as to overlap with the captured image. The graphic 44f indicative of another ship is placed so as to substantially overlap with the position of another ship 44r in the captured image.

The graphics 41f, 42f, . . . may be generated as results of rendering the three-dimensional shapes of the virtual reality objects 41v, 42v, . . . which constitute the three-dimensional scene data 48 illustrated in FIG. 4, from the viewpoint at the same position and the direction as those of the camera 3. Therefore, even when the graphics 41f, 42f, . . . are superimposed with the realistic image captured by the camera 3, a visual disagreement may not substantially occur.

As illustrated in FIG. 6, the graphics 41f, 42f, . . . which express the additional display information in virtual reality may be placed on the synthesized image as if they are placed on the sea surface of the captured image. In other words, the graphics 41f, 42f, . . . which express the additional display information in virtual reality may be displayed in the orientation in agreement with the inclination to the three-dimensional plane grasped from the water surface which appears in the captured image. Particularly, the graphics 41f, 42f, and 43f indicative of the waypoint 41, the route line 42, and the stopping area 43 may be placed as if a thin plate is pasted on the sea surface. This may be realized by placing the virtual reality objects 41v, 42v, . . . illustrated in FIG. 4 so as to touch the xz plane located below the camera 3 by a distance calculated based on the height set by the imaging position setting module 25 (see FIG. 1), and correctly placing the position of the projection screen 51 in consideration of the position and the direction of the camera 3.

Figure 7:
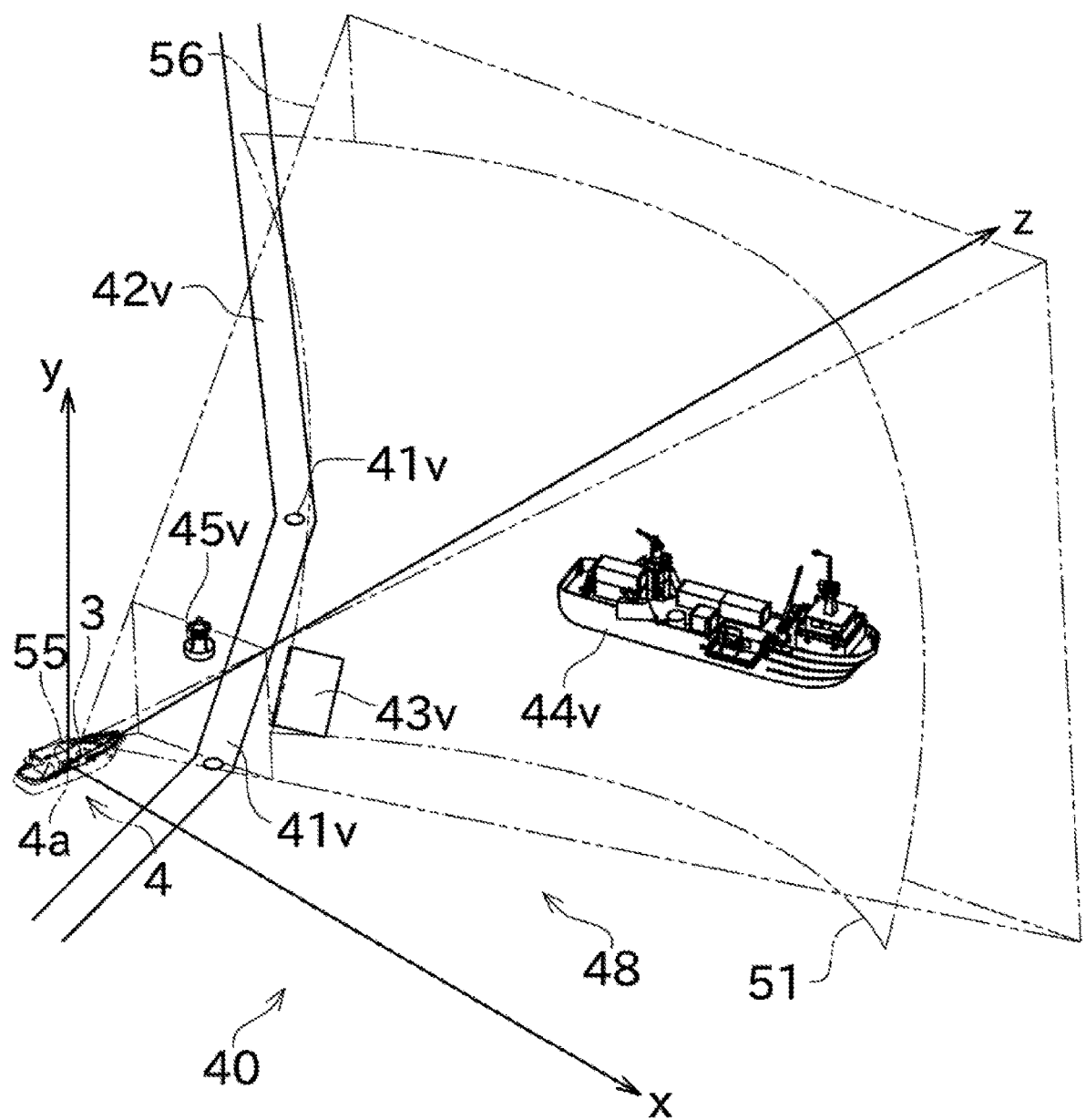
FIG. 7 is a conceptual diagram illustrating a case where the posture of the ship changes in a pitch direction and a roll direction from the state of FIG. 4.
Figure 8:
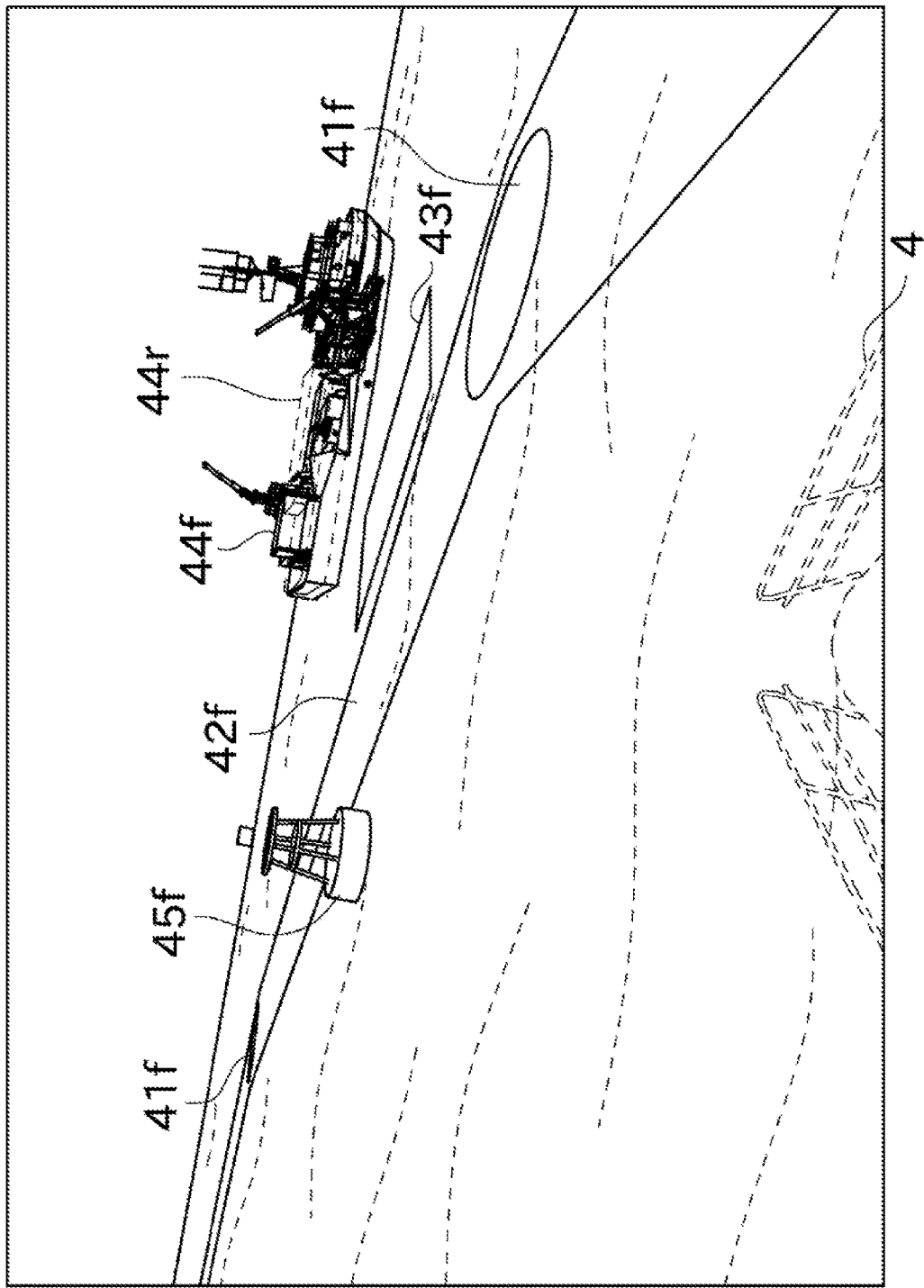
FIG. 8 is a view illustrating a synthesized image in the case of FIG. 7.

Next, a change in the synthesized image accompanying the shake of the ship 4 is described. FIG. 7 is a conceptual diagram illustrating a case where the posture of the ship 4 changes in the pitch direction and the roll direction from the state of FIG. 4. FIG. 8 is a view illustrating the synthesized image in the case of FIG. 7.

As described above, since the camera 3 is attached to the ship 4, its position and direction may change in connection with the posture of the ship 4 inclining by a wave etc., or the ship 4 running over a wave. In this embodiment, when a shake (pitching, rolling and heaving) occurs on the ship 4, the data synthesizing module 23 may change the position and the direction of the camera 3 in the three-dimensional virtual space 40 so as to simulate a change in the posture of the ship 4 acquired by the posture acquiring module 16, and a change in the position of the ship 4 in the vertical direction acquired by the position acquiring module 15, and change the position of the projection screen 51 accordingly.

In FIG. 7, a situation when the posture of the ship 4 changes in the pitch direction and the roll direction from the state of FIG. 4 is illustrated. In the example of FIG. 7, the ship 4 inclines the bow downward and the port downward, and the position and the direction of the camera 3 change so as to reflect the inclination. The projection screen 51 interlockedly moves to directly oppose to the camera 3 of which the position and the direction changed.

In the example of FIG. 7, by the viewpoint tracking mode, the position and the direction of the viewpoint camera 55 also change so as to follow the camera 3 of which the position and the direction changed as described above. One example of the synthesized image corresponding to FIG. 7 is illustrated in FIG. 8, and as illustrated in this figure, even if the position and the direction of the camera 3 change in connection with the shake of the ship 4, since the position and the direction of the projection screen 51 interlockedly change, and the position and the direction of the viewpoint camera 55 which renders the three-dimensional scene change, a comfortable synthesized image can be continuously obtained.

In the viewpoint tracking mode, each time the pitch angle or the roll angle changes more than a given value with the shakes of the ship 4, and/or, each time the height of the ship 4 changes more than a given value, the rendering of the three-dimensional scene data 48 may be updated by the data synthesizing module 23, and, therefore, the graphics 41f, 42f, . . . based on the latest viewpoint may be generated. Accordingly, the display of the graphics 41f, 42f, . . . can be changed appropriately to maintain a state where they are placed on the sea surface, while the position and the direction in which the sea surface appears change in the captured image of the camera 3 with the shakes of the ship 4.

Therefore, the extended-reality image in which the imaginary objects can be seen as if they are floating on the sea surface, and which is natural and high in the actual feeling can be obtained. Moreover, by the user looking at the sea surface projected on the display unit 2, since the graphics 41f, 42f, . . . indicating the virtual reality come into the user's field of view comprehensively, he/she can acquire every piece of necessary information.

Particularly, as illustrated in FIGS. 6 and 8, the graphic 42f indicative of the route line 42 which expresses the route set by the user using the plotter 11 may be displayed as if it is pasted on the sea surface of the image captured by the camera 3. Therefore, the user can grasp the route rendered on the sea surface (including the spatial relationship with the ship 4) with an actual feeling by looking at the sea surface of the synthesized image displayed on the display unit 2, and can intuitively perform the steering along the route. Note that, since the virtual reality object 43v indicative of the stopping area 43 is similarly displayed so as to be pasted onto the sea surface, the ship 4 can be easily moved to and stopped at the stopping area 43.

Further, although the virtual buoy 45 is intangible as described above, the graphic 45f expressing the virtual buoy 45 may be displayed as if it is tangible and floats on the sea surface of the image captured by the camera 3 in the synthesized image. Therefore, the user can understand the position of the virtual buoy 45 intuitively by the relation with the ship 4 etc., thereby facilitating the steering.

In this embodiment, each of the graphics 41$f$, 42$f$, . . . may also be displayed differently so that it is emphasized or not emphasized in the synthesized image. For example, when it is detected that the position of the ship 4 is deviated from the scheduled route, it is possible to blink the graphic 42$f$ of the route line 42. Moreover, it may be considered that the display color or transparency of the graphic 44$f$ of another ship 44 is changed according to the risk of a collision with the ship 4. Since the risk of a collision can be determined by various known methods, it is not described for details, but, for example a closest-approach distance between the ship and the target object and a time until the ship and the target object approach the closest are estimated, and the risk is determined based on the estimated distance and time. Therefore, for example, information can be displayed suitably with the emphasis according to the importance of this information among a plurality of information to be visually indicated to the user, thereby providing a user-friendly image.

In the image generating device 1 of this embodiment, displaying or not displaying the graphics 41$f$, 42$f$, . . . of the additional display information in the synthesized image can be switched, for example, for the respective additional display information, respective kinds of information, or respective ship instruments which are sources of the information, by operating the keyboard 31, the mouse 32, etc. Setup for displaying or not displaying the additional display information may be stored in the memory 18 illustrated in FIG. 1. Since the virtual reality object corresponding to the additional display information which is set as "not displaying" is not placed in the three-dimensional virtual space 40 when the three-dimensional scene data 48 is generated by the three-dimensional scene generating module 22, the graphic corresponding to the virtual reality object may not appear in the synthesized image. Therefore, the synthesized image which is organized to be easy-to-view can be obtained.

Note that, although in the example of FIG. 6 the waypoint, the route line, the stopping area, another ship, and the virtual buoy set by the user are indicated by the graphics 41$f$, 42$f$, . . . as the additional display information, the additional display information is not limited to these items. For example, in addition to the above items, the additional display information may include an arrival area, an ocean space where a school of fish is detected, a traveling prohibited area, a dangerous water area, land, a landmark, etc. Therefore, information useful for the user can be displayed in the mode in which the information is easy to be visually grasped.

As described above, the image generating device 1 of this embodiment may include the position acquiring module 15, the posture acquiring module 16, the additional display information acquiring module 17, the three-dimensional scene generating module 22, and the data synthesizing module 23. The position acquiring module 15 may acquire the positional information indicative of the position on the earth of the ship 4 where the camera 3 is installed. The posture acquiring module 16 may acquire the posture information indicative of the posture of the ship 4. The additional display information acquiring module 17 may acquire the additional display information including the information indicative of the positions of a plurality of locations (information on the route line 42 and the stopping area 43). The three-dimensional scene generating module 22 may generate the three-dimensional scene data 48 based on the positional information, the posture information, and the positions of the plurality of locations contained in the additional display information acquired by the additional display information acquiring module 17 so that at least some of the graphics 42$f$ and 43$f$ indicative of the additional display information are superimposedly displayed so that the graphics 42$f$ and 43$f$ are placed on the water surface of the image to be outputted from the camera 3. The data synthesizing module 23 may output the graphics 42$f$ and 43$f$ which render the three-dimensional scene data 48.

Therefore, based on the position and the posture of the ship 4, the three-dimensional display indicative of the position etc. of the additional display information (the route line 42 and the stopping area 43) can be outputted as the graphics 42$f$ and 43$f$. Therefore, the virtual-reality synthesized image can be realized by displaying these graphics 42$f$ and 43$f$ placed on the captured image (see FIGS. 6 and 8). The user may look at this synthesized image, and it may become easy to intuitively grasp the situation indicated by the additional display information, as well as the spatial relationship. Moreover, by the display in which the graphics 42$f$ and 43$f$ of the additional display information are placed along the water surface of the captured image, the user can intuitively grasp the relation between the plurality of locations (e.g., the direction of the route line 42 and the shape of the stopping area 43).

Moreover, in the image generating device 1 of this embodiment, displaying or not displaying the graphics 41$f$, 42$f$, . . . indicative of the additional display information can be set individually, depending on the kind of information, or depending on the ship instrument which is the source of information.

Therefore, the graphics 41$f$, 42$f$, . . . which are displayed in virtual reality can be selectively displayed or not displayed according to the user's preferences etc. Therefore, it can prevent that the graphics are crowded and the display becomes unclear.

Moreover, in the image generating device 1 of this embodiment, the additional display information may include the information on the route line 42 which is the route of the ship 4 set by the user. The three-dimensional scene generating module 22 may generate the three-dimensional scene data 48 for displaying the graphic 42$f$ indicative of the route line 42.

Therefore, in the synthesized image, since the graphic 42$f$ indicative of the route is displayed superimposedly so that it is placed on the water surface of the image captured by the camera 3, it may become easy for the user to grasp the direction in which the route extends. Therefore, for example, it may become easy to steer etc. the ship along the set-up route.

Moreover, in the image generating device 1 of this embodiment, the route line 42 may be generated so that it connects the plurality of waypoints 41 set by the user. The three-dimensional scene generating module 22 may generate the three-dimensional scene data 48 for displaying the graphic 41$f$ indicative of the waypoint 41, along with the graphic 42$f$ indicative of the route line 42.

Therefore, in the synthesized image, the information on the waypoint 41 can also be easily grasped, together with the direction in which the route of the ship 4 extends, etc. Therefore, it may become even easier to steer etc. the ship along the set-up route.

Moreover, in the image generating device 1 of this embodiment, the additional display information may include the stopping area 43 which is the area indicative of the stopping location of the ship 4 set by the user. The three-dimensional scene generating module 22 may generate the display data for displaying the graphic 43*f* indicative of the stopping area 43.

Therefore, in the synthesized image, the graphic 43*f* of the stopping area 43 which is the area spreading planarly can be displayed so that it is pasted to the water surface of the captured image. Therefore, since it becomes easy for the user to grasp the shape of the stopping area 43, it may become easy to stop the ship 4 at the stopping area 43, for example.

Moreover, in the image generating device 1 of this embodiment, the additional display information may include the information on another water-surface movable body (another ship 44). The three-dimensional scene generating module 22 may change the display mode of the graphic 44*f* indicative of another ship 44 according to the risk of the collision of the ship 4 and another ship 44.

Therefore, for example, among the plurality of information to be visually expressed to the user, another ship 44 with a high risk of the collision can be displayed so as to be more emphasized than other target objects, thereby providing the user-friendly image which is suitably emphasized.

Moreover, in the image generating device 1 of this embodiment, the rendering of the three-dimensional scene data 48 may be updated based on the change in the posture acquired by the posture acquiring module 16.

Therefore, since the graphics 41*f*, 42*f*, . . . are displayed so that the state where they are placed on the water surface of the captured image is maintained, even if the captured image of the camera 3 changes by the influences of shakes of the ship 4 due to the wave etc., a comfortable display can be realized.

Moreover, the position acquiring module 15 of the image generating device 1 of this embodiment may acquire the positional information based on the radio waves received from the positioning satellites by the GNSS antennas installed in the ship 4. Moreover, the image generating device 1 may be provided with the antenna position setting module 26 which can set the antenna positions which are the positions of the GNSS antennas in the ship 4. The three-dimensional scene generating module 22 may generate the three-dimensional scene data 48 for displaying the graphics 41*f*, 42*f*, . . . based on the antenna positions.

Therefore, since the positions etc. of the graphics 41*f*, 42*f*, . . . indicative of the additional display information are determined in consideration of the positions of the GNSS antennas in the ship 4, the deviations of the display positions can be prevented.

Moreover, the image generating device 1 of this embodiment may be provided with the imaging position setting module 25 which can set the imaging position which is the position of the camera 3 in the ship 4. The three-dimensional scene generating module 22 may generate the three-dimensional scene data 48 for displaying the graphics 41*f*, 42*f*, . . . based on the imaging position.

Therefore, since the positions etc. of the graphics 41*f*, 42*f*, . . . indicative of the additional display information are determined in consideration of the position of the camera 3 in the ship 4, the deviations of the display positions can be prevented.

Moreover, in the image generating device 1 of this embodiment, the imaging position setting module 25 can set the height of the camera 3.

Therefore, the graphics 41*f*, 42*f*, . . . indicative of the additional display information can be generated in consideration of the camera 3. Accordingly, since it can prevent that the graphics 41*f*, 42*f*, . . . appear so that they are submerged under the water surface or float over the water surface, the natural display which does not spoil the actual feeling can be realized.

Moreover, in the image generating device 1 of this embodiment, the posture acquiring module 16 may acquire the posture information based on the phase differences of the carrier phases of the radio waves received from the positioning satellites by the plurality of GNSS antennas installed in the ship 4.

Therefore, since the posture of the ship 4 can be acquired with high precision, the synthesized images with less uncomfortableness can be obtained.

Although the suitable embodiment of the present disclosure is described above, the above configuration may be modified, for example, as follows.

The data synthesizing module 23 may be configured not to simultaneously render the three-dimensional scene data 48 and the projection screen 51. That is, the data synthesizing module 23 may also separately create the two-dimensional image (the images of the graphics 41*f*, 42*f*, . . . ) which is the rendering result of the three-dimensional scene data 48 alone, and the two-dimensional image (the image where the captured image is pasted to the projection screen 51) which is a rendering result of the projection screen 51 alone, and then synthesize the two-dimensional images one with another. In this case, while rendering the three-dimensional scene data 48 each time the ship 4 moves etc., the rendering of the projection screen 51 may be performed at a short interval according to the frame rate of the image captured by the camera 3.

In the camera 3, the pan/tilt function may be omitted, and the imaging direction may be fixed to, for example, forward. Moreover, the camera 3 may be arranged to image a direction other than the forward (e.g., rearward).

When the imaging direction of the camera 3 does not change as described above, the synthesizing of the captured image and the graphics 41*f*, 42*f*, . . . may also be performed by an external device, without being performed by the image generating device 1 (data synthesizing module 23). That is, a graphic outputting module (display outputting module) may be provided instead of the data synthesizing module 23, and this graphic outputting module may perform a rendering in a state where the projection screen 51 is omitted in the three-dimensional scene of FIG. 4 to generate the images of the graphics 41*f*, 42*f*, . . . alone. By synthesizing this images and the captured image of the camera 3 by the external synthesizing device, the synthesized image as illustrated in FIG. 6 can be obtained.

Further, the camera 3 may be configured to simultaneously image the perimeter of the ship 4 in all directions of 360 degrees.

When the user performs an operation to change the viewpoint of the synthesized image, the pan/tilt operation of the camera 3 may be automatically performed so as to follow the change in the viewpoint.

Upon generating the three-dimensional scene data 48 by the three-dimensional scene generating module 22, the virtual reality objects 41*v*, 42*v*, . . . may be placed on the basis of the bow direction using the position of the ship 4 as the origin in the above embodiment, as illustrated in FIG. 4. However, the virtual reality objects 41*v*, 42*v*, . . . may be placed on the basis of north in which the +z direction always points north, without the bow direction. In this case, when the bow direction of the ship 4 changes due to a turn etc., the direction of the ship 4 in the three-dimensional virtual space

40 may be changed to the yaw direction, instead of rearranging the virtual reality objects 41v, 42v, . . . . Then, the changes in the position and the direction of the camera 3 at this time may be simulated in the three-dimensional virtual space 40, and a rendering may be performed in the interlocking manner while changing the position and the direction of the viewpoint camera 55, thereby obtaining the completely same rendering result as the case of the bow direction basis.

Alternatively, the coordinate system of the three-dimensional virtual space 40 may be defined so that a fixed point suitably defined on the earth is used as the origin, and, for example, the +z direction serves as north and the +x direction serves as east, instead of using the position of the ship 4 as the origin. In this case, in the three-dimensional virtual space 40 of the coordinate system fixed to the earth, the position and the direction of the ship 4 may change based on the positional information and the posture information, and the change in the position and the direction of the camera 3 accompanying the change may be simulated in the three-dimensional virtual space 40.

In image generating device 1, a shake of the synthesized image accompanying the shake of the ship 4 may be reduced. For example, the three-dimensional scene generating module 22 may reduce the change in the position and the direction of the viewpoint camera 55, even when the ship 4 shakes.

The graphics 41f, 42f, . . . (the graphics which constitute a part of the synthesized image) outputted from the data synthesizing module 23 may be thin and planar so as to be pasted to the water surface, or may be a three-dimensional or solid object which projects from the water surface by a certain height. For example, instead of expressing the stopping area 43 of the ship 4 by the planar graphic 43f, it may be expressed by a rectangular parallelepiped frame graphic having a contour of the stopping area 43 and having a given height. Similarly, for example, the waypoint 41 may be expressed by arbitrary three-dimensional figures, such as cylindrical and pyramid, for example, which projects from the water surface, instead of the planar graphic 41f.

The imaging position setting module 25 may be configured to set the position of the camera 3 in the ship 4 as a relative position with respect to the GNSS antenna(s).

The ship instruments (information source of the additional display information) connected to the image generating device 1 are not limited to what is described in FIG. 1, and other ship instruments may be included.

The present disclosure is applicable not only to the ship which travels on the sea, but may also be applicable to arbitrary water-surface movable bodies which can travel, for example, the sea, a lake, or a river.

Figure 9:
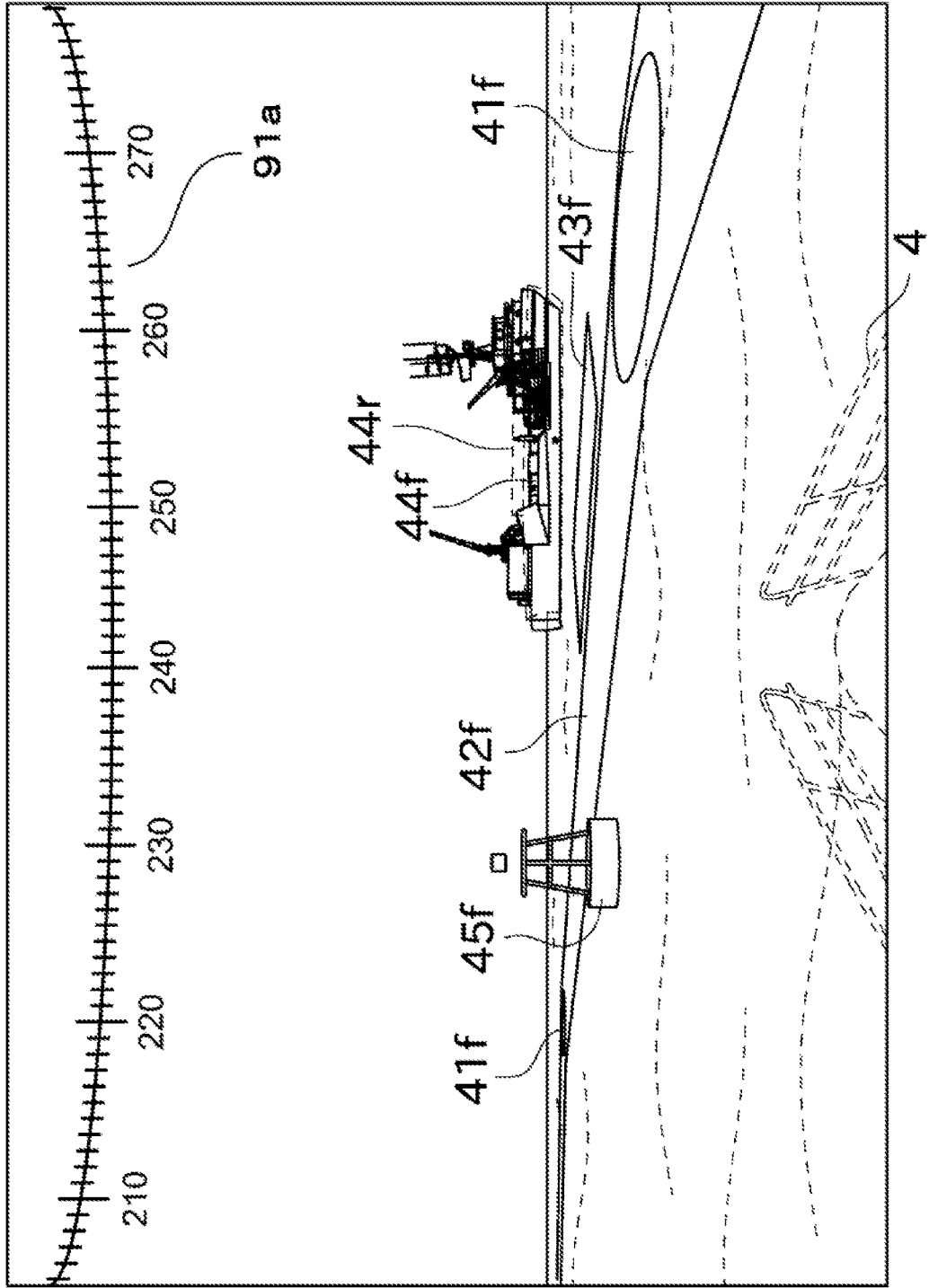
FIG. 9 is Display Example 1 of a direction scale.
Figure 10:
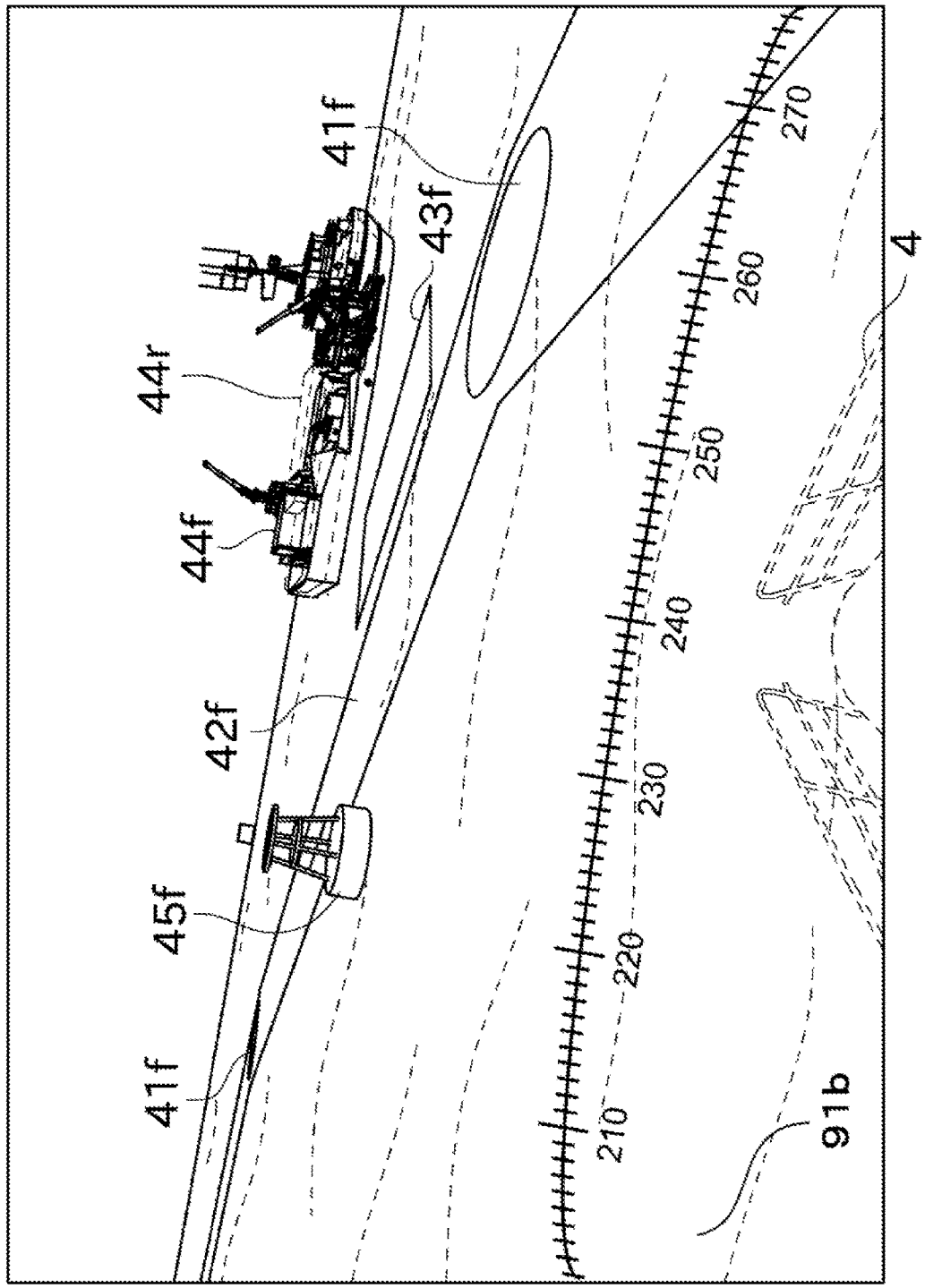
FIG. 10 is Display Example 2 of the direction scale.

When displaying the graphics etc. superimposedly on the image captured by the imaging device as described above, the limited display area can be effectively utilized by simultaneously displaying additional information 91a and 91b, such as the scale images etc. indicative of the direction, as illustrated in FIGS. 9 and 10. At this time, the positions of the additional information may be automatically changed and moved so that the graphics are not hidden by the additional information as much as possible. Moreover, the additional information 91a and 91b may be displayed so as to incline according to the inclination of the hull. By displaying in such a way, exact additional information can always be visually observed even when the hull inclines.

Figure 11:
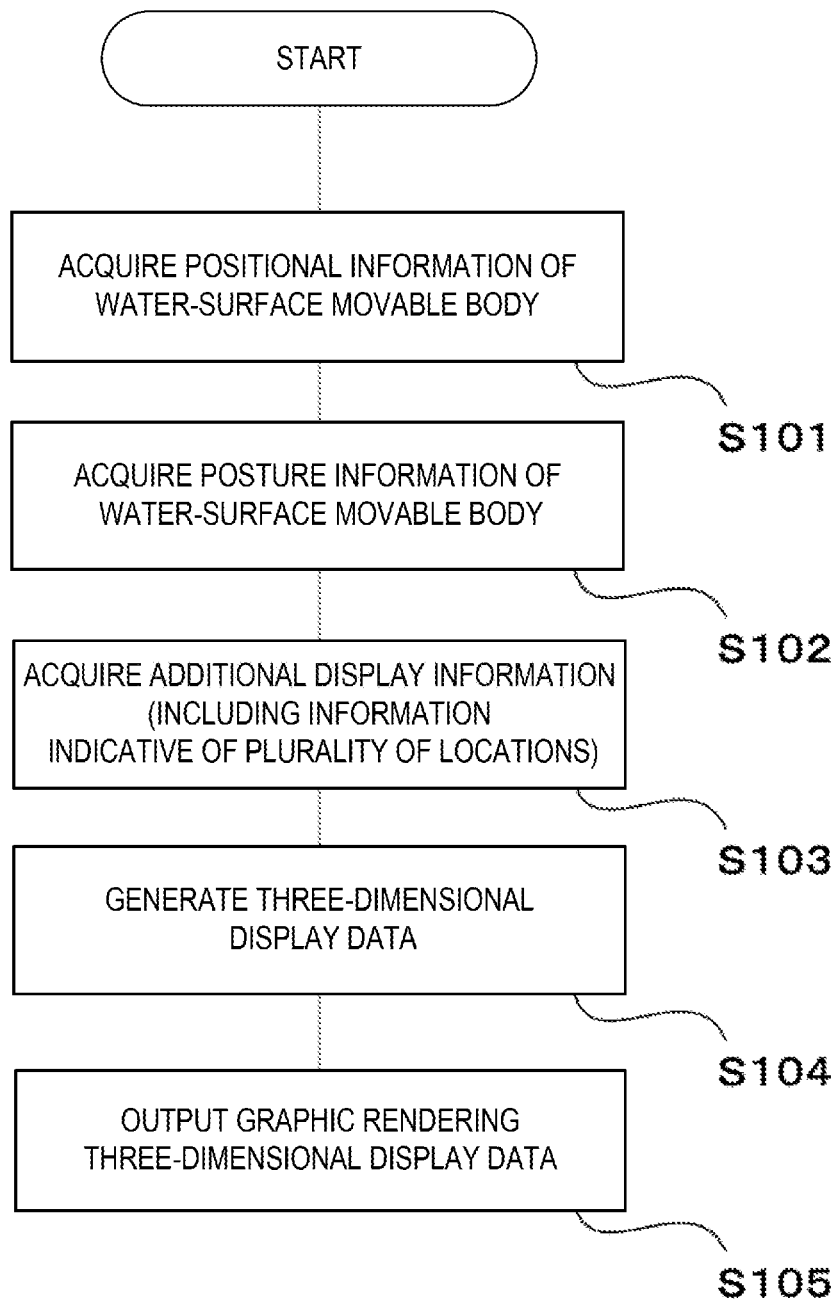
FIG. 11 is a flowchart of a method of generating an image according to one embodiment of the present disclosure.

Processing performed by the image generating device 1 in this embodiment of the present disclosure is described referring to a flowchart of FIG. 11. In this embodiment, the positional information indicative of the position of the water-surface movable body where the imaging device is installed may be acquired (S101). The posture information indicative of the posture of the water-surface movable body may be acquired (S102), and the additional display information including the information indicative of the positions of the plurality of locations may be acquired (S103). Based on the positional information, the posture information, and the positions of the plurality of locations included in the additional display information, the three-dimensional display data may be generated so that at least some of the graphics indicative of the additional display information are superimposedly placed on the water surface of the image outputted from the imaging device (S104), and the graphic rendering the three-dimensional display data may be outputted (S105), to solve the problems described above.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of generating an image, comprising:
acquiring positional information indicative of a position of a water-surface movable body in which an imaging device is installed;
acquiring posture information indicative of a posture of the water-surface movable body;
acquiring additional display information including information indicative of positions of a plurality of locations;
generating three-dimensional display data for displaying a graphic indicative of the additional display information by superimposedly placing the graphic on a water surface portion of an image outputted from the imaging device based on the positional information, the posture information, and the positions of the plurality of locations included in the additional display information;
generating a scale image indicative of an azimuth; and
outputting the graphic rendering the three-dimensional display data, wherein
a display position of the scale image is determined according to a display position of the graphic superimposedly displayed on the image outputted from the imaging device such that the graphic is not hidden by the scale image,
the additional display information includes information on an other water-surface movable body, and
the method further comprises changing a mode of display of a graphic indicative of the other water-surface movable body according to a degree of risk of a collision of the water-surface movable body with the other water-surface movable body.

2. An image generating device, comprising:
processing circuitry configured to:
acquire positional information indicative of a position of a water-surface movable body in which an imaging device is installed;
acquire posture information indicative of a posture of the water-surface movable body;
acquire additional display information including information indicative of positions of a plurality of locations;
generate three-dimensional display data for displaying a graphic indicative of the additional display information by superimposedly placing the graphic on a water surface portion of an image outputted from the imaging device based on the positional information, the posture information, and the positions of the plurality of locations included in the additional display information;
generate a scale image indicative of an azimuth; and
output the graphic rendering the three-dimensional display data, wherein
a display position of the scale image is determined according to a display position of the graphic superimposedly displayed on the image outputted from the imaging device such that the graphic is not hidden by the scale image,
the additional display information includes information on an other water-surface movable body, and
the processing circuitry is further configured to change a mode of the display of the graphic indicative of the other water-surface movable body according to a degree of risk of a collision of the water-surface movable body with the other water-surface movable body.

3. The image generating device of claim 2, wherein the additional display information includes an area indicative of a drop-in location or a destination of the water-surface movable body set by a user; and
the processing circuitry is further configured to generate the three-dimensional display data for displaying a graphic indicative of the drop-in location or the destination.

4. The image generating device of claim 2, wherein the rendering of the three-dimensional display data is updated based on a change in the posture.

5. The image generating device of claim 2, wherein the processing circuitry is further configured to:
acquire the positional information based on radio waves received from positioning satellites by positioning antennas installed in the water-surface movable body;
set antenna positions that are positions of the positioning antennas in the water-surface movable body; and
generate the three-dimensional display data for displaying the graphic based on the antenna positions.

6. The image generating device of claim 2, wherein the processing circuitry is further configured to:
set an imaging position that is a position of the imaging device in the water-surface movable body; and
generate the three-dimensional display data for displaying the graphic based on the imaging position.

7. The image generating device of claim 6, wherein the processing circuitry is further configured to set at least a height of the imaging device.

8. The image generating device of claim 2, wherein the processing circuitry is further configured to acquire the posture information based on a phase difference of carrier phases of radio waves received from positioning satellites by positioning antennas installed in the water-surface movable body.

9. The image generating device of claim 2, wherein the additional display information includes a route of the water-surface movable body set by a user; and
the processing circuitry is further configured to generate the three-dimensional display data for displaying a graphic indicative of the route.

10. The image generating device of claim 9, wherein the route is generated by connecting way points set by the user; and
the processing circuitry is further configured to generate the three-dimensional display data for displaying a graphic indicative of the way points, together with the graphic indicative of the route.

11. The image generating device of claim 9, wherein the additional display information includes an area indicative of a drop-in location or a destination of the water-surface movable body set by the user; and
the processing circuitry is further configured to generate the three-dimensional display data for displaying a graphic indicative of the drop-in location or the destination.

12. The image generating device of claim 11, wherein the rendering of the three-dimensional display data is updated based on a change in the posture.

13. The image generating device of claim 12, wherein the processing circuitry is further configured to:
acquire the positional information based on radio waves received from positioning satellites by positioning antennas installed in the water-surface movable body;
set antenna positions that are positions of the positioning antennas in the water-surface movable body; and
generate the three-dimensional display data for displaying the graphic based on the antenna positions.

14. The image generating device of claim 13, wherein the processing circuitry is further configured to:
set an imaging position that is a position of the imaging device in the water-surface movable body; and
generate the three-dimensional display data for displaying the graphic based on the imaging position.

15. The image generating device of claim 14, wherein the processing circuitry is further configured to set at least a height of the imaging device.

16. The image generating device of claim 15, wherein the processing circuitry is further configured to acquire the posture information based on a phase difference of carrier phases of the radio waves received from the positioning satellites by the positioning antennas installed in the water-surface movable body.

* * * * *